(12) United States Patent
Ohtsuka

(10) Patent No.: US 6,198,526 B1
(45) Date of Patent: *Mar. 6, 2001

(54) METHOD AND APPARATUS FOR RECORDING ORDER INFORMATION

(75) Inventor: Shuichi Ohtsuka, Kanagawa-ken (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,899

(22) Filed: Sep. 10, 1998

(30) Foreign Application Priority Data

Sep. 11, 1997 (JP) .................................................. 9-247160
Jun. 22, 1998 (JP) ................................................ 10-174239

(51) Int. Cl.[7] .......................... G03B 27/52; G03B 17/24; H04N 5/76
(52) U.S. Cl. .............................. 355/40; 348/232; 396/310
(58) Field of Search ............................... 355/40; 348/239, 348/232, 207, 231; 395/102, 117; 707/526, 527; 396/310, 311, 321; 358/906, 909.1

(56) References Cited

U.S. PATENT DOCUMENTS

| 5,153,729 | * | 10/1992 | Saito ..................................... 358/209 |
| 5,420,699 | * | 5/1995 | Yamanouchi et al. ............... 358/487 |
| 5,467,168 | * | 11/1995 | Kinjo et al. ............................ 355/77 |
| 5,477,264 | * | 12/1995 | Sarbadhikari et al. ............... 348/231 |
| 5,574,533 | * | 11/1996 | Itoh ....................................... 396/639 |
| 5,633,678 | * | 5/1997 | Parulski et al. ....................... 348/232 |
| 5,666,215 | * | 9/1997 | Fredlund et al. ..................... 358/487 |
| 5,696,576 | * | 12/1997 | Itoh et al. .............................. 355/40 |
| 5,943,093 | * | 8/1999 | Anderson et al. ................... 348/232 |
| 5,974,401 | * | 10/1999 | Enomoto et al. ....................... 705/40 |

FOREIGN PATENT DOCUMENTS

410283404 * 10/1998 (JP) .

* cited by examiner

Primary Examiner—Russell Adams
Assistant Examiner—Rodney Fuller
(74) Attorney, Agent, or Firm—Birch, Stewart, Kolasch, & Birch, LLP

(57) ABSTRACT

In the case of a print order where the content of an order regarding print output is provided from a user to a laboratory in a digital form, necessity of printing or the like can be decided at the time of image data acquisition and the image data sets can be classified and stored before they are provided to the laboratory. Furthermore, an order of prints wherein a plurality of image data sets are used, such as printing of a composed photograph, can be placed easily. A portion of the order information, such as necessity of printing, is added to image data as tag information. The reset of the order information is described as order information in an order file. The image data to be printed is specified by image information in the order file, and an addition to flag showing that the tag information needs to be referred to is set to ON. A printing order receiving apparatus receives both the image file and the order file and carries out processing on the image data according to the tag information and the order information.

62 Claims, 7 Drawing Sheets

FIG.6

ORDER FILE ; Fuji 001.ord
    Customer=Ohtsuka
    Print Size=C
    Order Information on Imatge Data ; 1    NAME OF CUSTOMER
                                                                               PRINTING PAPER SIZE
    Image=//IM02/*.fpx              PRESENCE OR ABSENCE OF FIRST
                                                                               ORDER INFORMATION
TAG INFORMATION                          INFORMATION TO SHOW LOCATION
    image 0201.fpx                          OF IMAGE DATA
        Print Flag= 1
        Quantity= 1 image 0202.fpx
        Print Flag= 1
        Quantity= 2 image 0204.fpx
        Print Flag= 0 image 0205.fpx
        Print Flag= 1
        Quantity= 1
        Print Size=H

FIG.7

ORDER FILE ; Fuji 001.ord
    Customer=Ohtsuka                        NAME OF CUSTOMER
    Quantity= 1                               QUANTITY OF THE IMAGE
    Print Size=A4                           PRINTING PAPER SIZE
    Template ID=Fuji 00125              ID OF TEMPLATE TO BE USED
    Order Information on Imatge Data ; 1    PRESENCE OR ABSENCE OF FIRST ORDER INFORMATION Image=//application/IMO3/*.jpg      INFORMATION TO SHOW LOCATION OF IMAGE DATA Text=TRIP TO HOKKAIDO               CHARACTER STRING TO BE ADDED TO TEMPLATE Page Number Flag= 1                FLAG TO SHOW WHETHER PAGE NUMBER IS ADDED TAG INFORMATION
    image 001.jpg
        Print Flag= 1
        Print Rotation= 0 image 002.jpg
        Print Flag= 0 image 003.jpg
        Print Flag= 1
        Print Rotation=90 image 004.jpg
        Print Flag= 1
        Print Rotation=90

METHOD AND APPARATUS FOR RECORDING ORDER INFORMATION

BACKGROUND OF THE INVENTION

1. Field of the Invention

The present invention relates to a method and an apparatus, in a digital photographic service for recording information to order printing of image data, a method and an apparatus for receiving this information, a printing method and a printing apparatus for reproducing the image data as printed images, and a computer-readable recording medium which records a program for executing these methods.

2. Description of the Related Art

In a digital photographic service in which photographic prints are generated from image data, an order placing method wherein a user provides a laboratory or the like with the content of the order, such as the quantity of the prints, in the form of digital data has been known.

Some digital cameras have a function to set the print quantity or necessity of printing. Such a camera sets this information by recording it in a memory of the camera as a portion of tag information added to image data. In this case, a user can order printing by providing a laboratory or the like with the digital camera itself whose memory holds image data and its tag information added thereto or with another recording medium wherein. the image data have been recorded.

Furthermore, another method wherein an order file separated from the image data and describing the content of the order alone is provided to the laboratory has also been known. In this method, in the case where image data have been stored in the laboratory or the like, only the order file needs to be provided. Therefore, it is suitable for the case where the amount of data to be transferred is preferably reduced, such as the case where orders are placed via a network. Furthermore, by separating the order file from image data, the location of the image data can be indicated by the order file, which leads to more freedom of storage location.

In the method wherein the content of an order is added to image data, in order to automatically receive the order and to carry out printing by a printer in a laboratory, it is necessary to set a storage location (directory) in a recording medium from which the printer reads the image data and to store the printing target image data in this predetermined directory. This recording medium is then provided to a laboratory. For example, when a plurality of directories exist in a recording medium, it is necessary for a certain directory to be a directory from which a printer reads image data, and image data need to be stored in this directory when an order is placed.

Meanwhile, because of the spread of large capacity removable recording media such as ZIP discs and MO discs, the number of image data sets which can be recorded within a single recording medium has been increased. Therefore, there is a need for storing image data under a plurality of directories. For example, customers wish to store image data classified by events, such as photographs taken on a trip and at an athletic meeting, or classified by types of cameras by which image data have been obtained.

In such a case, in the method wherein the content of an order is added to image data, it is necessary to store image data only in a predetermined directory designated by aprinter. Therefore, it is necessary to place an order to a laboratory after image data having been stored in a plurality of directories are moved into the predetermined directory. Thus, ordering prints is thus very troublesome.

Furthermore, since the content of an order needs to be specified separately for each image data set in this method, a request to make a composite photograph by using a plurality of image data sets cannot be met.

Meanwhile, in the method generating an order file, the location of image data storage can be specified in an order file, if the location of an order file storage or a directory is predetermined. Therefore, a need for customers to store image data according to a classification, as has been described above, can be met. Furthermore, since image data are separated from the content of an order, printing of a composite photograph specifying a plurality of image data sets can be dealt with.

However, in this method, it is necessary that all images are displayed and confirmed after they have been photographed, in order to decide whether or not the images are to be printed. Furthermore, in this method, since the content of a printing order regarding a plurality of image data sets is described in one file, the order file size is not known before the file is actually generated. As a result, a problem sometimes occurs such that an order file cannot be generated in an environment wherein the capacity of a memory is restricted.

SUMMARY OF THE INVENTION

The present invention solves the above problem by providing a laboratory or the like with an order file describing a portion of the content of an order and image data to which the rest of the content has been added.

In other words, in an order information recording method of the present invention which records image data and the content of an order regarding print output of the image data in a recording medium as digital data, image data to which first order information describing a portion of the content of the order has been added are recorded in a first recording medium; and an order file including location information showing the location of the image data to be printed and addition information showing that the first order information has been added to the image data is recorded in a second recording medium.

The "image data to which order information ... has been added" refers to order information included in tag information in an image file format such as EXIF, JPEG, or TIFF wherein the tag information is added to the head of image data, for example. Alternatively, both image data and order information may be recorded in a file such as a FlashPix file proposed by Eastman Kodak Co. for recording plural data sets whose nature is different from one to another, for example.

The "location information" refers to information specifying a directory, or a file, or a group of files wherein image data to be printed are located, for example. The group of file herein referred to means the case where all files having a certain extension are specified by using a wild card (like *.jpg), for example.

The "addition information" refers to a flag or the like which takes a value of 1 if the first order information added to image data exists, and takes a value of 0 otherwise, for example.

To "record image data and an order file ... in a recording medium" refers not only to the case where image data and an order file are recorded in a recording medium such as a FD, a ZIP disc, an MO disc, or an IC card, but also the case where image data and an order file are recorded temporarily in a memory of a computer in order to transfer them from a user to a laboratory via a network, for example. In this case, the first recording medium may be the same as or separate from the second recording medium.

It is preferable to record second order information showing the content of an order in the order file.

The content of an order represented by the second order information may be the same as or different from a portion of the content of the order represented by the first order information.

It is preferable that the first order information shows the content of processing for each image data set and the second order information includes the content of processing which is common among image data sets. In this case, it is preferable for the second order information to include information specifying a combination of image data sets.

More specifically, it is preferable that the first order information includes quantity information specifying the quantity of each print, trimming information specifying an area in an image to be printed, and size information specifying the size of each print, for example.

Moreover, it is preferable that the second order information includes template information specifying a template describing a combination of plural image data sets, character string information specifying a character string to be combined with a composed image generated by using the template, and image processing information specifying the kind of image processing to be carried out on the image data, for example.

The "template" herein referred to means a background image to insert two images at predetermined positions thereof, for example. In other words, by placing an order specifying such a template and data for the two desired images, a composed photograph wherein the two specified images are inserted in the background image can be output.

The "image processing" refers to finished processing such as red-eye correction or scenery finish. The kinds of available image processing are usually shown to a user in advance, and the user can specify the processing by selecting a number representing the processing and describing the number as a portion of the order information in a file, for example.

A first printing order receiving method of the present invention obtains the order file and the image data to which the first order information has been added from the first and second recording media wherein the content of an order has been described according to the order information recording method wherein the second order information is not recorded in the order file.

A second printing order receiving method of the present invention obtains the order file and the image data to which the first order information has been added from the first and the second recording media wherein the content of an order has been described according to the order information recording method wherein the second order information is recorded in the order file.

To "obtain the order file and the image data" herein referred to means to obtain the image data and the order file from the recording medium provided by a user to a laboratory, and to obtain the image data and the order file transferred from a personal computer of a user to a laboratory via a network, for example. More specifically, various kinds of medium drives or communication means, and software therefor, obtain the image data and the order file.

A printing method of the present invention carries out printing based on the image data and the order file obtained by the second printing order receiving method of the present invention, and is characterized by the facts that the content of the first order information is compared with the content of the second order information; and the printing is carried out according to either the first or the second order information when the content conflicts between the first and the second order information.

In this case, when the content conflicts between the first and the second order information, the time of the image data generation and order file generation is compared and the printing may be carried out based on the order information with the most recent time of generation.

A program by which a computer executes the order information recording method, the printing order receiving method and the printing method of the present invention may be recorded in a recording medium and provided to users.

An order information recording apparatus of the present invention records image data and the content of an order regarding print output of the image data in a recording medium as digital data, and comprises:

image data recording means which records in a first recording medium image data to which first order information showing a portion of the content of the order has been added; and order file recording means which records in a second recording medium an order file wherein location information showing the location of the image data to be printed and addition information showing that the first order information has been added to the image data, has been recorded.

It is preferable that second order information showing the content of the order is recorded in the order file by the order information recording apparatus of the present invention.

A first printing order receiving apparatus of the present invention comprises:

image data obtaining means which obtains image data to which the first order information has been added from the first and the second recording media wherein the content of the order has been recorded by the order information recording apparatus which does not record the second order information in the order file; and order file obtaining means which obtains the order file.

A second printing order receiving apparatus of the present invention comprises:

image data obtaining means which obtains image data to which the first order information has been added from the first and the second recording media wherein the content of the order has been recorded by the order information recording apparatus which records the second order information in the order file; and order file obtaining means which obtains the order file.

A printing apparatus of the present invention carries out printing based on the image data and the order file obtained by the second printing order receiving apparatus of the present invention, comprises:

content comparing means which compares the content of the first order information with that of the second order information, and is characterized by the fact that the printing apparatus carries out the printing based on either the first or second order information when the content conflicts between the first and the second order information.

In this case, when the content conflicts between the first and the second order information, it is preferable that the printing apparatus comprises means which compares the time of image data generation and order file generation so that the printing apparatus can carry out the printing based on the order information with the most recent time of generation.

The order information recording method and apparatus of the present invention record the content of a printing order in the form of the first order information added to image data and the order file separate from the image data in the first and the second recording media. In this manner, a user can add information about items which are convenient in deciding upon generation (photographing) of image data to the image data, and the content of the order can also be described in the order file. Therefore, image data stored under a complex directory structure or items common among plural image data sets, or the content of an order regarding plural image data sets, such as the case of printing of a composed photograph, can be specified without confusion.

If the first order information is assumed to show the content of an order regarding each image data set and the second order information is assumed to show the processing which is common among the image data sets, the items in the second order information are limited to some degree, and it becomes easier to estimate a memory capacity necessary therefor. Therefore, a problem such that an order file cannot be generated because of memory shortage can be avoided.

If several kinds of templates describing combinations (layout) of plural image data sets are provided to a user in advance and a desired template and image data sets are specified as the order information, orders for processed prints comprising a plurality of image data sets can be dealt with.

The printing order receiving method and apparatus of the present invention receive the content of a printing order as the order information added to image data and as the order file separate from the image data. In this manner, the content of an order generated by the order information recording method and apparatus of the present invention and recorded in a recording medium can be received without confusion.

The printing method and apparatus of the present invention carry out printing based on either the first or the second order information when the content conflicts between the first and the second order information in the order information received by the printing order receiving method and apparatus which receive the content of an order in the form of the first order information added to the image data and the second order information recorded in the order file. In this manner, according to the printing method and apparatus of the present invention, printing can be carried out without confusion even in the case where the content conflicts between the first and the second order information.

BRIEF DESCRIPTION OF THE DRAWINGS

FIG. 6 is a diagram showing a first example of how an order file and tag information are described; and FIG. 7 is a diagram showing a second example of how the order file and the tag information are described.

DESCRIPTION OF THE PREFERRED EMBODIMENT

Figure 1:
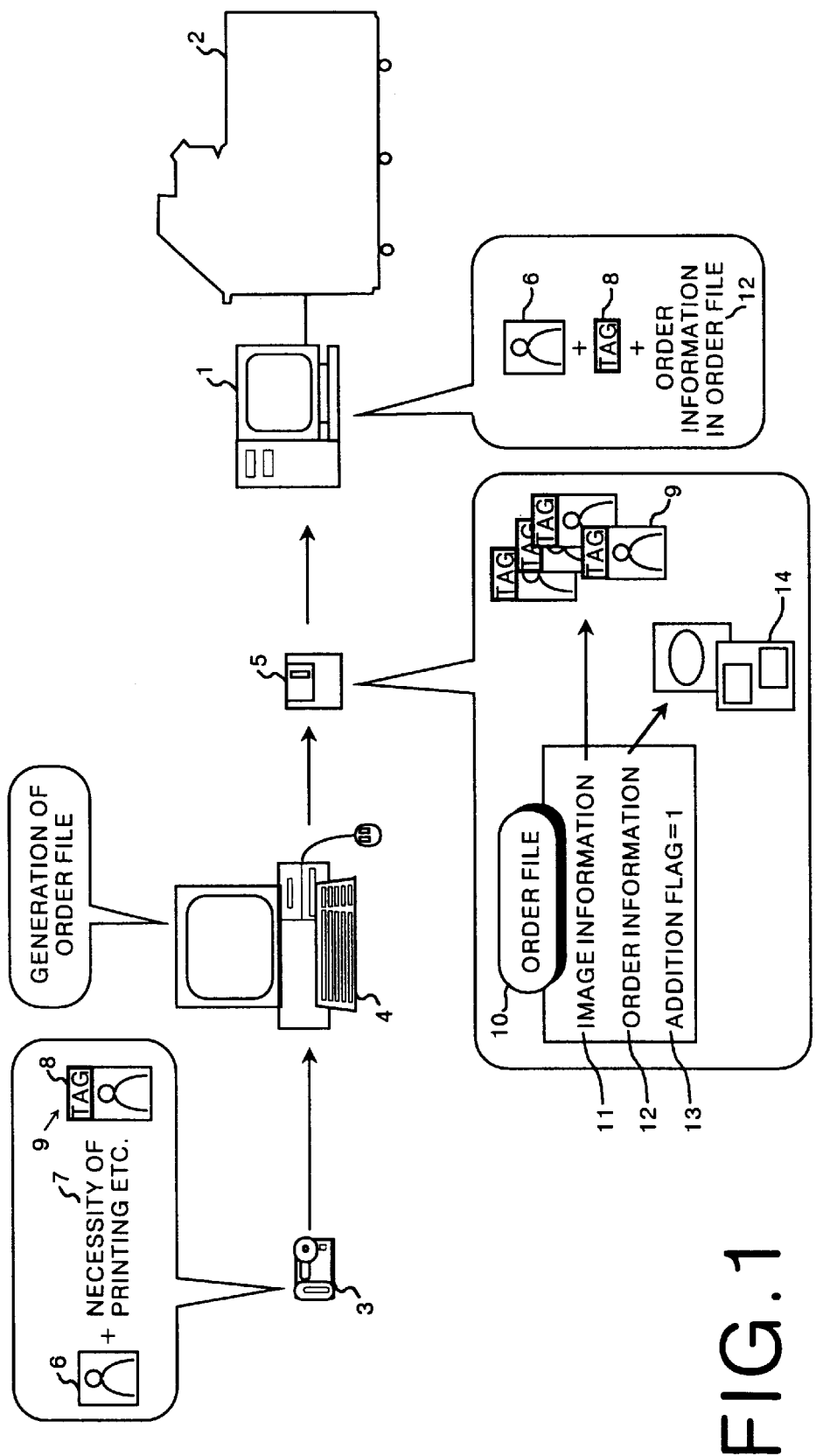
FIG. 1 is a diagram showing an outline of order processing in an embodiment of the present invention.

Hereinafter, an embodiment of the present invention will be explained with reference to the accompanying drawings. FIG. 1 is a diagram showing an outline of order processing using an order information recording apparatus, a printing order receiving apparatus, and a printing apparatus of the present invention. In FIG. 1, a digital camera 3 and a personal computer 4 are owned by a user, and a printing order receiving apparatus 1 and a photographic printer 2 connected thereto are installed in a laboratory or the like. A recording medium 5 is used by the user to provide the laboratory with order information and image data to be printed. In this embodiment, the photographic printer 2 serves as the printing apparatus and the digital camera 3 and the personal computer 4 are regarded as the order information recording apparatus.

An image having been photographed by the digital camera 3 is usually recorded as image data 6 in a memory of the digital camera 3. At this time, in the case of a digital camera including a liquid crystal monitor, the photographed image can be confirmed on the monitor immediately after photographing. Therefore, in the case of a digital camera including a function to set order information 7 such as necessity of printing and the quantity of the print, it can be decided at the time of photographing whether or not printing is to be ordered.

In this case, the order information 7 having been set is added to the image data 6 as tag information 8 to generate an image file 9. Alternatively, it is not necessarily added in the form of tag information, but another form may also be used. In other words, any state wherein the image data 6 and the order information 7 showing necessity of printing and the like can be dealt with as the image file 9 can be accepted. As a standard for such an image file format, EXIF format which has been known as an image file format for digital cameras, or JPEG and TIFF which have been known as formats of data to be dealt with by personal computers can be used, for example.

Alternatively, a file format such as FlashPix proposed by Eastman Kodak Co. wherein a plurality of data sets of a different nature can be recorded as a file may be used to record image data and order information in one file. The file format does not need to be a standardized format as long as the digital camera 3, the personal computer 4, and the order receiving apparatus 1 can recognize the format. However, in order to deal with cameras or systems by different manufacturers, it is preferable to follow a standardized format.

The order information 7 to be added to the image data 6 may include a print flag showing whether or not printing is necessary, the quantity and the size of the print, and an area to be trimmed, for example. This information is input by displaying setting value choices on the monitor of the digital camera 3 and by selecting one of them using a key button attached to the digital camera 3, for example.

In this embodiment, the print flag is set to 1 if printing is necessary, or set to 0 if not. Setting of other items only becomes possible when the print flag is 1. The quantity of a print is set by a number and stored. The size of a print can be chosen from C (standard), H (wide), P (panoramic), "yotsugiri", and A4 for example, and stored as a predetermined number or the like.

Figure 2:
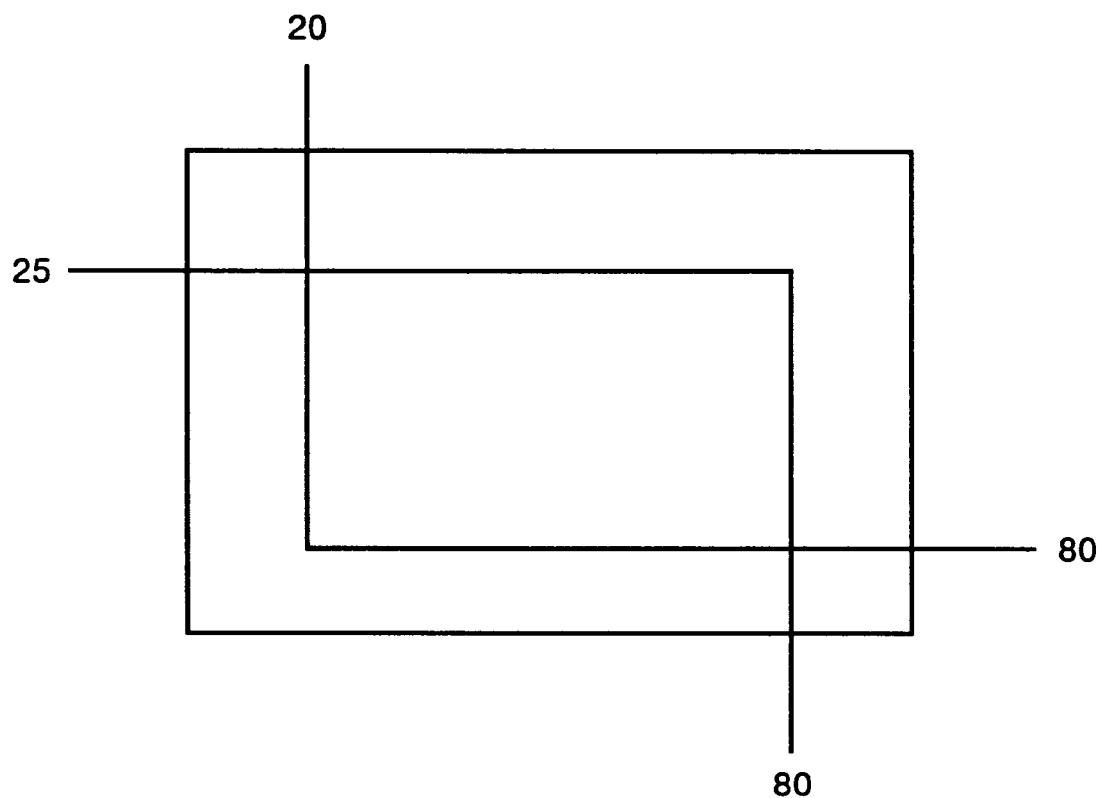
FIG. 2 is a diagram showing an example of trimming specification.

The area to be trimmed is specified by ratios (%) of the upper left and lower right corners of the area to the vertical and horizontal length of the original image. For example, in FIG. 2, the upper left corner point of the area to be trimmed is located at a position of 20% of the horizontal length and 25% of the vertical length when measured from the upper left corner point of the original image used as a reference. Therefore, this point is recorded as a number 2025. Likewise, the lower right corner point of the area to be trimmed is recorded as 8080.

The image file 9 is input into the personal computer 4 of a user. Referring to the image data 6 on the personal computer if necessary, the user generates an order file 10 and records the order file 10 together with the image file 9 in the recording medium 5. The order file 10 is generated by dedicated software installed in the personal computer 4 and includes three kinds of information, namely image information 11, order information 12, and an addition flag 13.

Figure 3:
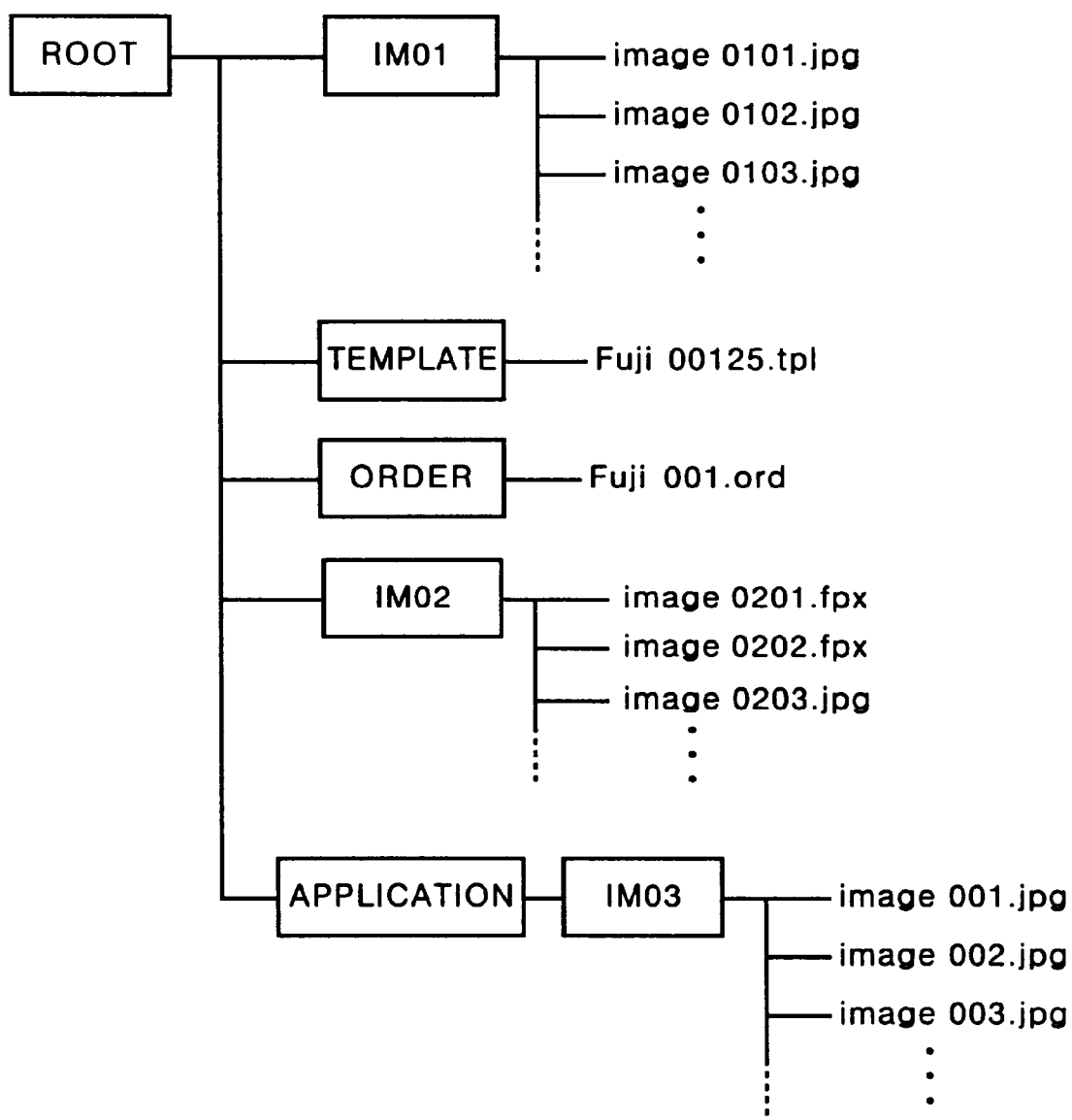
FIG. 3 is a diagram showing an example of a recording medium structure.

The image information 11 shows the location of the image file 9. For example, FIG. 3 shows a directory structure when a user records the order file 10 and the image file 9 in the recording medium 5. As shown in FIG. 3, in this embodiment, 5 directories (IM01, Template, Order, IM02, and Application) exist, and the Application directory includes an IM03 directory. The image file 9 is recorded in IM01, IM02 and IM03 according to a classification. The Template directory stores a template file (Fuji00125.tpl) therein and the Order directory holds an order file (Fuji001.ord). In this embodiment, the image information 11 may specify printing targets as sole files or as a group of files using a wild card (*) which is known as a method to specify files in the personal computer 4. More specifically, when all image files 9 containing a prefix character string "IM" in their names are specified as printing targets, they can be specified by information "IM*.*". When all JPEG files are to be printed, they can be specified as "*.jpg". Furthermore, it is possible to add information showing a directory under which the image file 9 to be printed is stored. Moreover, it is also possible to use a combination of information showing a wild card and a directory. For example, "//IM01/*.jpg" referes to specification of all JPEG files including the prefix character string "IM" in their names stored under the IM01 directory, for example. Alternatively, "//Application/IM03/*.*" referes to a group of files containing all files stored under the IM03 directory in the Application directory, for example.

The order information 12 specifies the content of printing. In this embodiment, the kind of printing paper (glossy, not glossy, transparent sheets, for example), the size of the prints, the width of the white print-margin, the number of prints, the type of template to be combined with, the template ID, a character string to be used, flags for various kinds of image processing are specified as the order information 12.

The size of prints can be specified not only by a predefined expression such as C, H, and P but also by any length and width.

The print size and the quantity of the prints can be specified by using the digital camera 3. However, the size and the quantity of the prints as a portion of the order information 7 in the tag information 8 are set for each image data set, while those specified as the order information 12 in the order file 10 can be set for only one order file 10 or for one directory specified by the image information 11.

In this embodiment, the specification by the order file 10 has priority, and only when no specification exists in the order file 10, does the size and the quantity in the tag information 8 become valid. Therefore, when printing of a plurality of image data sets is ordered by the order file 10, the size and the quantity are specified for the all images to be printed. When the sizes or the quantities are different from one image to another, the sizes or the quantities do not have to be specified by the order file 10.

The type of template to be combined with specifies the kind of composition. In this embodiment, "plural-image layout" and "combination with a template" can be specified. The kind of 14 template to be used is specified by the template ID number, and the character string to be laid out in the composed image is specified as a portion of the order information.

Figure 4:
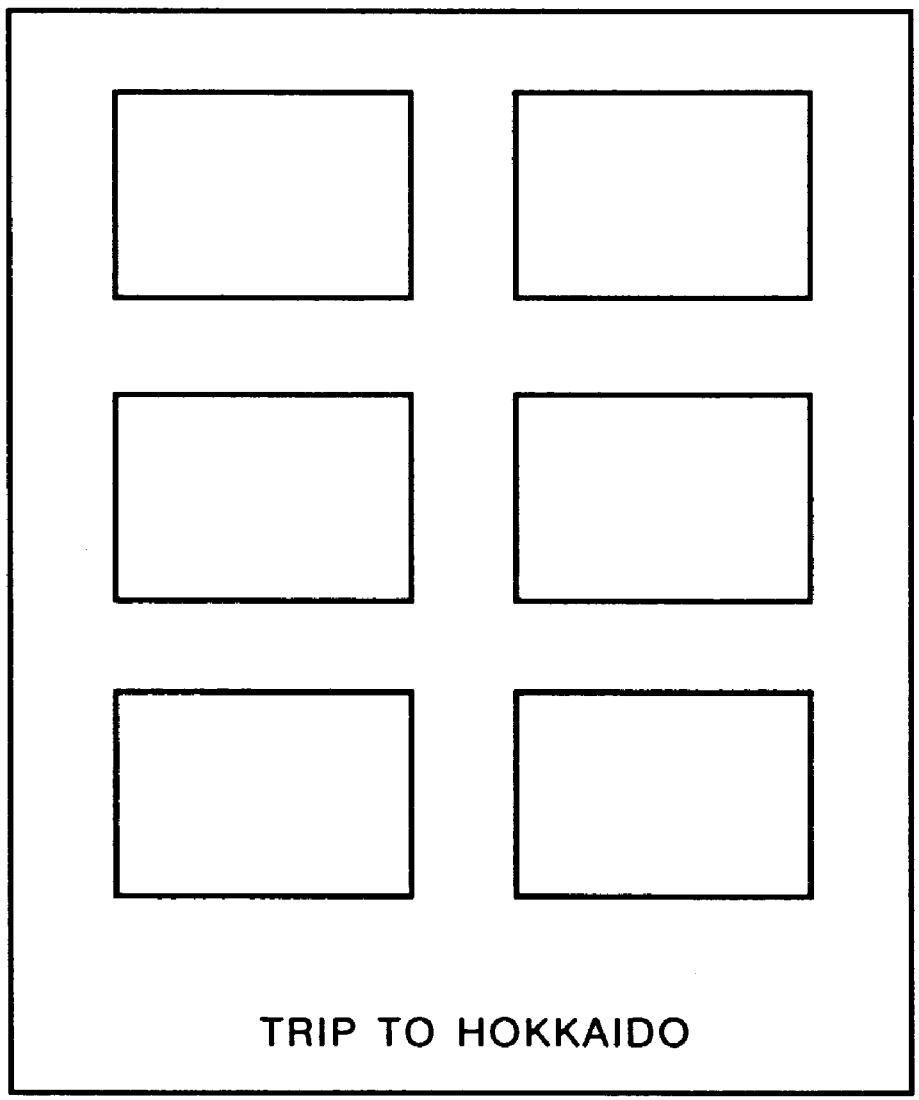
FIG. 4 is a diagram showing an example of positioning plural images.

The plural-image layout positions a plurality of images specified as a group of files by the image information 11 with a template image mainly in a plain color or with a pattern, as shown in FIG. 4. The user can generate an album (album prints) by choosing the plural-image layout. In the plural-image layout, the position of each image or a specified character string, the font of the characters, the size, the color, and the transparency ratio (the ratio of the area occupied by the images to the area of the background image) are all predefined for each template. In the plural-image layout, the print quantity instruction included in the tag information is invalid, and the quantity specified in the order file becomes valid.

Figure 5:
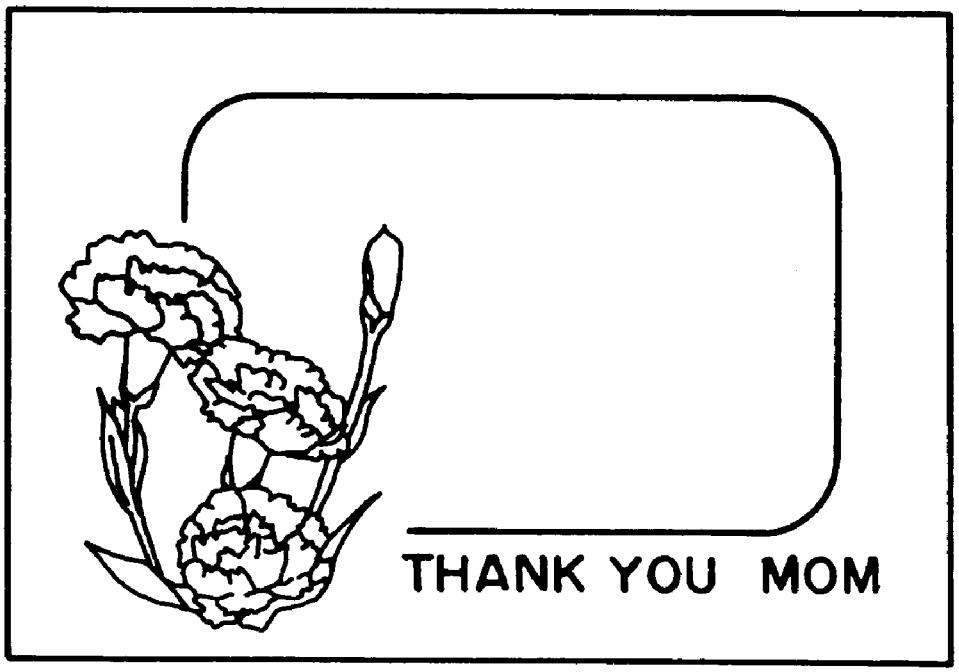
FIG. 5 is a diagram showing an example of a combination with a template.

The combination with a template combines a template image wherein clip-arts or the like are laid out with an image specified by the order file, as shown in FIG. 5. For example, if an area to be printed has been specified by the trimming information, the specified area is trimmed out from the original image and embedded in the template image. In the combination with a template, embedding of the title, the date of photographing, and clip-arts can also be realized. The quantity specification by the order information in the tag information is valid in the combination with a template.

The image processing flags specified in the order information 12 are used for specifying special image processing carried out upon print output. More specifically, the special image processing includes red-eye correction for correcting red eyes which is likely to occur upon photographing using a flash, and automatic trimming which automatically identifies the main object of the image and trims an appropriate area including the main object, for example. Furthermore, image processing in accordance with characteristics of each photographing, such as scenery finish, portrait finish, wedding finish, and athletic meeting finish, can also be specified. For example, if the flag for the scenery finish is set to ON, image processing which is optimal for a scenery photograph, that is, enhancement of saturation and sharpness is carried out by the system in the laboratory.

In the above, the content of the order information 12 has been described in detail. Besides the image information 11 and the order information 12, the order file 10 includes the addition flag 13. This flag is to show that information specifying the content of an order has been added as the tag information 8 to the image data 6. Depending on the content of an order, the content of the order can be specified by the order file 10 alone, and this flag is set to OFF in such a case so that the order receiving apparatus 1 can promptly judge by this flag whether or not it needs to refer to the tag information.

In other words, the order receiving apparatus 1 in this embodiment receives the image file 9 and the order file 10 via the recording medium 5, carries out image processing requested by the user according to the tag information 8 and the order information 12 within the order file 10 on the image data 6 specified by the image information 11 within the order file 10, and instructs the photographic printer 2 to output prints requested by the user.

The specific description content of the tag information 8 in the image file 9 and that of the order file 10 will be explained next. FIG. 6 is a diagram showing a first example of the specific content of the order file 10 and the tag information 8. In the first example, among image files having an extension "fpx" stored under a directory "IM02", only image files whose print flags are ON are printed. In the order file 10 in FIG. 6, the name of a customer (Customer), the print size as a portion of the order information 12 (Print Size), the addition flag 13 (Order Information on Image Data; 1 ("1"0 means the flag is ON)), and the location of the image file 9 as a portion of the image information 11 (Image=//IM02/*.fpx) are described. In the tag information 8, Print Flag=1 and Quantity=1 for a file image0201.fpx, Print Flag=1 and Quantity=2 for a file image0202.fpx, Print Flag=0 for a file image0204.fpx, Print Flag=1, Quantity=1 and Print Size=H for a file image0205.fpx are described.

According to the order file 10 and the tag information 8 described as in the first example, printing is carried out by the photographic printer 2 in the following manner. The file image0203.jpg under the IM02 directory is not printed, since it has an extension different from fpx. The file image0204.fpx is not printed either, since its print flag is 0. One and two prints of image0201.fpx and image0202.fpx respectively are generated in C size specified in the order file 10, since neither file has the size information. The file image0205.fpx has the print size H which is different from the size specified by the order file 10. In this embodiment, image0205.fpx is printed in C size, since the specification by the order file 10 has priority.

In this embodiment, the specification by the order file 10 has priority when the specification by the tag information 8 is different from that by the order file 10. The specification by the tag information may have priority, however. For example, when the specification by the tag information 8 has priority, the file image0205.fpx is printed in H size. Alternatively, by comparing the time of generation between the image file 9 and the order file 10, specification by the file generated later may have priority.

FIG. 7 shows a second example of the specific description content of the tag information 8 and the order file 10. In the second example, among the image files having an extension "jpg" under the directory "IM03", only image files whose print flags are ON are pasted on a template represented by a template file (see FIG. 4) under the Order directory. When the images are printed over a plurality of pages, page numbers are added. A character string (Trip to Hokkaido) is added to a certain position in the template.

In the order file 10 in FIG. 7, the name of the customer (Customer), the number of prints (Quantity) of an image as a portion of the order information 12, the print size, the number of a template to be used (Template ID=Fuji00125.tpl), the addition flag 13 (Order Information on Image Data; 1), the location of the image file 9 as a portion of the image information 11 (Image=//application/IM03/*.jpg), the character string to be added (Text=Trip to Hokkaido), and a flag showing whether or not the page numbers are added (Page Number Flag=1) are described.

In the tag information 8, Print Flag=1 and Print Rotation=0 for a file image 001.jpg, Print Flag=0 for a file image002.jpg, Print Flag=1 and Print Rotation=90 for a file image003.jpg, and Print Flag=1, Print Rotation=90 for a file image004.jpg are described. The specification regarding rotation of an image is expressed in degrees. Therefore, Print Rotation=0 means no rotation, while Print Rotation=90 means that the image is pasted on a template after being rotated by 90 degrees.

According to the order file 10 and the tag information described as in the second example, printing is carried out by the photographic printer 2 in the following manner. The file image002.jpg is not printed, since its print flag is 0. The file image001.jpg is not rotated, and image003.jpg and image004.jpg are rotated by 90 degrees. The above three files are printed on the template wherein the character string "Trip to Hokkaido" has been added. The template in this embodiment can have up to 6 images pasted thereon. Therefore, when the number of images to be printed 20, 3 prints with 6 images on each and a print with the remaining 2 images are generated. Furthermore, the page numbers are added according to the instruction by the order file 10.

As has been described above, according to the present invention, by describing order information separately in the tag information 8 and in the order file 10, a sophisticated order such as the one using plural directories or image composition can be dealt with without losing ease of specification of printing at the time of photographing.

In the above embodiment, the image file 9 and the order file 10 are taken in by the order receiving apparatus 1 via the recording medium 5. However, they may be transferred to the order receiving apparatus 1 via a network. In this case, the image file 9 and the order file 10 are transferred after being temporarily stored in a memory of the personal computer 4.

Furthermore, in the above embodiment, the image file 9 and the order file 10 are recorded in the single recording medium 5, which may be recorded in separate recording media.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An order information recording method for recording image data and content of an order relating to output printing of the image data in a recording medium as digital data, comprising:

recording image data together with first print order information, describing a portion of the content of the output printing order, on a recording medium; and recording an order file, including location information referring to a location of image data to be printed, and recording addition information referencing that the first print order information has been stored together with the image data, on a recording medium, wherein the first print order information is recorded after display of the image data using a digital camera.

2. An order information recording method as claimed in claim 1 wherein the image data, first print order information and order file are each recorded on the same recording medium.

3. An order information recording method as claimed in claim 1 wherein the first print order information includes quantity information specifying a print quantity.

4. An order information recording method as claimed in claim 1 wherein the first print order information includes trimming information specifying an area of the image data to be printed.

5. An order information recording method as claimed in claim 1 wherein the first print order information includes size information specifying a print size.

6. An order information recording method as claimed in claim 1 wherein the location information includes information identifying a plurality of sets of image data to be printed.

7. An order information recording method as claimed in claim 1 wherein second print order information showing a content of the order is recorded in the order file.

8. An order information recording method as claimed in claim 7 wherein the first print order information shows processing content for each image data set and the second print order information includes processing content common among image data sets.

9. An order information recording method as claimed in claim 8 wherein the second print order information includes information specifying a combination of image data sets.

10. An order information recording method as claimed in claim 7 wherein the second print order information includes template information specifying a template describing a combination of image data sets.

11. An order information recording method as claimed in claim 10 wherein the second print order information includes character string information specifying a character string to be combined with a composite image generated using the template.

12. An order information recording method as claimed in claim 7 wherein the print order information includes image processing information specifying a kind of image processing to be carried out on the image data.

13. A printing order receiving method comprising:
  obtaining the image data to which the first print order information has been added; and
  obtaining the order file from the recording medium, wherein the first order information and order file have been recorded by the print order information recording method as defined by claim 1.

14. A printing order receiving method comprising:
  obtaining the image data to which the first print order information has been added; and
  obtaining the order file, including the second order information, from the recording medium, wherein the first order information and order file have been recorded by the print order information recording method as defined by claim 7.

15. A printing method for printing based on the image data and the order file obtained by the printing order receiving method as defined by claim 14, comprising:
  comparing the content of the first print order information with the content of the second order information; and
  carrying out printing according to either the first or the second print order information when the content conflicts between the first and the second print order information.

16. A printing method as claimed in claim 15 further comprising:
  comparing a time of image data generation and order file generation when the content of the first print order information conflicts with the content of the second print order information; and
  carrying out the printing based on the print order information having the relatively most recent time of generation.

17. A computer-readable recording medium, containing a program further causing a computer
  to obtain image data, to which the first print order information has been added, from a recording medium, wherein the first order information and order file have been recorded according to the print order information recording method as defined in claim 1; and
  for causing a computer to obtain the order file.

18. A computer-readable recording medium containing a program for causing a computer
  to obtain image data, to which the first print order information has been added, from a recording medium, wherein the first order information and order file have been recorded according to the print order information recording method as defined in claim 7; and
  for causing a computer to obtain the order file.

19. A computer-readable recording medium containing a program for causing a computer to execute a printing method in which printing is carried out based on the image data and the order file obtained by the printing order receiving method as defined in claim 14, wherein
  the program further causes the computer to compare the content of the first print order information with the content of the second print order information; and
  causes the computer to carry out the printing based on either the first or the second print order information when the content conflicts between the first and the second print order information.

20. The computer-readable recording medium as claimed in claim 19 wherein the program further causes the computer to compare a time of generation of the image data with a time of generation of the order file when the content conflicts between the first and the second print order information, and
  causes the computer to carry out the printing based on the print order information having the most recent time of generation.

21. An order information recording method as claimed in claim 1, wherein the addition information indicates a presence or absence of the first order information.

22. An order information recording method as claimed in claim 1, wherein the image data and first print order information are recorded on the recording medium using a digital camera.

23. An order information recording method as claimed in claim 22, wherein the first print order information is recorded after display of the image data using a digital camera.

24. An order information recording method as claimed in claim 22, wherein the first print order information is stored as tag information associated with the image data.

25. An order information recording method as claimed in claim 24, wherein the first print order information includes a print flag indicating whether or not an image should be printed.

26. An order information recording method as claimed in claim 22, wherein the first print order information includes a print flag indicating whether or not an image should be printed.

27. An order information recording method as claimed in claim 1, wherein the first print order information includes a print flag indicating whether or not an image should be printed.

28. An order information recording method as claimed in claim 1, further comprising:
  displaying selectable print first print order information after recording image data; and
  selecting first print order information to be recorded with the image data.

29. An order information recording method as claimed in claim 28, wherein the image data and first print order information are recorded on the recording medium using a digital camera.

30. An order information recording method as claimed in claim 29, wherein the first print order information includes a print flag indicating whether or not an image should be printed.

31. An order information recording method as claimed in claim 30, wherein other first print order information is selected upon the print flag being set so as to indicate that an image should be printed.

32. An order information recording apparatus for recording image data and content of an order relating to output printing of the image data in a recording medium as digital data, comprising:

image data recorder, adapted to record on a recording medium, image data together with first print order information describing a portion of the content of the output printing order; and order file recorder, adapted to record on a recording medium, an order file including location information referring to a location of image data to be printed, and adapted to record addition information referencing the first print order information has been stored together with the image data, wherein the first print order information is recorded after display of the image using a digital camera.

33. An order information recording apparatus as claimed in claim 32 wherein the image data, the first print order information and order file are recorded on the same recording medium.

34. An order information recording apparatus as claimed in claim 32, wherein the first print order information includes quantity information specifying a print quantity.

35. An order information recording apparatus as claimed in claim 32 wherein the first print order information includes trimming information specifying an area of the image data to be printed.

36. An order information recorded apparatus as claimed in claim 32 wherein the first print order information includes size information specifying a print size.

37. An order information recording apparatus as claimed in claim 32 wherein the location information includes information identifying a plurality of sets of image data to be printed.

38. An order information recording apparatus as claimed in claim 32 wherein second print order information showing a content of the order is recorded in the order file.

39. An order information recording apparatus as claimed in claim 38 wherein the first print order information shows processing content for each image data set and the second print order information includes processing content common among image data sets.

40. An order information recording apparatus as claimed in claim 39 wherein the second print order information includes information specifying a combination of image data sets.

41. An order information recording apparatus as claimed in claim 38 wherein the second print order information includes template information specifying a template describing a combination of image data sets.

42. An order information recording apparatus as claimed in claim 41 wherein the second print order information includes character string information specifying a character string to be combined with a composite image generated using the template.

43. An order information recording apparatus as claimed in claim 38 wherein the second print order information includes image processing information specifying a kind of image processing to be carried out on the image data.

44. A printing order receiving apparatus comprising:

image data obtaining means for obtaining image data having the first print order information from the recording medium added thereto, wherein the first order information and order file have been recorded by the print order information recording apparatus as defined in claim 38; and order file obtaining means for obtaining the order file.

45. A printing apparatus comprising:

printing means for printing based on the image data and the order file obtained by the printing order receiving apparatus as defined in claim 44; and content comparing means for comparing the content of the first print order information with the content of the second print order information, wherein the printing means carries out the printing based on either the first or the second print order information when the content conflicts between the first and the second print order information.

46. A printing apparatus as claimed in claim 45 further comprising:

time-of-generation comparing means for comparing time of generation between the image data and the order file when the content conflicts between the first and the second print order information, wherein the printing means carries out the printing based on the print order information having the most recent time of generation.

47. A printing order receiving apparatus comprising:

image data obtaining means for obtaining for obtaining image data having the first print order information from the recording medium added thereto, wherein the first order information and order file have been recorded by the print order information recording apparatus as defined in claim 32; and order file obtaining means for obtaining the order file.

48. A computer-readable recording medium including a program for causing a computer to execute a print order information recording method in which the content of a print order regarding print output of image data is recorded in a recording medium as digital data together with the image data, comprising:

a first segment for causing the computer to record on a recording medium, image data including first print order information, describing a portion of the content of the print order; and a second segment for causing a computer to record on a recording medium, an order file including location information referring to a location of image data to be printed, and to record addition information referencing that the first print order information has been stored together with the image data, wherein the first print order information is recorded after display of the image data using a digital camera.

49. A computer-readable recording medium as claimed in claim 48 wherein the image data, first print order information and order file are each recorded on the same recording medium.

50. A computer-readable recording medium as claimed in claim 48 wherein the first print order information includes quantity information specifying a print quantity.

51. A computer-readable recording medium as claimed in claim 48 wherein the wherein the first print order information includes trimming information specifying an area of the image data to be printed.

52. A computer-readable recording medium as claimed in claim 48 wherein the first print order information includes size information specifying a print size.

53. A computer-readable recording medium as claimed in claim 48 wherein the location information includes information identifying a plurality of sets of image data to be printed.

54. A computer-readable recording medium as claimed in claim 48 wherein the second print order information showing a content of the order is recorded in the order file.

55. A computer-readable recording medium as claimed in claim 54 wherein the first print order information shows processing content for each image data set and the second print order information includes processing content common among image data sets.

56. A computer-readable recording medium as claimed in claim 55 wherein the second print order information includes information specifying a combination of image data sets.

57. A computer-readable recording medium as claimed in claim 54 wherein the second print order information includes template information specifying a template describing a combination of image data sets.

58. A computer-readable recording medium as claimed in claim 57 wherein the second print order information includes character string information specifying a character string to be combined with a composite image generated using a template.

59. A computer-readable recording medium as claimed in claim 54 wherein the second print order information includes image processing information specifying a kind of image processing to be carried out on the image data.

60. An order information recording method for recording image data and content of an order relating to output printing of the image data in a recording medium as digital data, comprising:

recording image data together with first print order information, describing a portion of the content of the output printing order, on a recording medium; and recording an order file, including location information referring to a location of image data to be printed, and recording addition information referencing that the first print order information has been stored together with the image data, on a recording medium.

61. An order information recording apparatus for recording image data and content of an order relating to output printing of the image data in a recording medium as digital data, comprising:

an image data recorder, adapted to record on a recording medium, image data together with first print order information describing a portion of the content of the output printing order; and an order file recorder, adapted to record on the recording medium, an order file including location information referring to a location of image data to be printed, and adapted to record addition information referencing that the first print order information has been stored together with the image data.

62. A computer-readable recording medium including a program for causing a computer to execute a print order information recording method in which the content of a print order regarding print output of image data is recorded in a recording medium as digital data together with the image data, comprising:

a first segment for causing the computer to record on a recording medium, image data including first print order information, describing a portion of the content of the print order; and a second segment for causing a computer to record on the recording medium, an order file including location information referring to a location of image data to be printed, and to record addition information referencing that the first print order information has been stored together with the image data.

* * * * *